(12) United States Patent
Winter

(10) Patent No.: US 7,620,681 B2
(45) Date of Patent: Nov. 17, 2009

(54) CLIENT IN A CLIENT-SERVER NETWORK AND A METHOD OF OPERATION

(75) Inventor: Moritz Winter, Munich (DE)

(73) Assignee: 12Snap AG, Munich (DE)

( * ) Notice: Subject to any disclaimer, the term of this patent is extended or adjusted under 35 U.S.C. 154(b) by 519 days.

(21) Appl. No.: 11/351,750

(22) Filed: Feb. 9, 2006

(65) Prior Publication Data

US 2006/0230104 A1   Oct. 12, 2006

(30) Foreign Application Priority Data

Feb. 11, 2005   (EP)   ................................ 05002890

(51) Int. Cl.
    *G06F 15/173*   (2006.01)
(52) U.S. Cl. ..................................... 709/203
(58) Field of Classification Search ............... 709/203, 709/205
    See application file for complete search history.

(56) References Cited

U.S. PATENT DOCUMENTS

| | | | |
|---|---|---|---|
| 5,822,563 A * | 10/1998 | Sitbon et al. ................ 719/330 |
| 6,072,946 A * | 6/2000 | Dooley et al. ................ 703/13 |
| 6,578,188 B1 * | 6/2003 | Pang et al. .................... 716/19 |
| 6,918,771 B2 * | 7/2005 | Arington et al. ............. 434/262 |
| 7,027,971 B2 * | 4/2006 | Gabele et al. ................. 703/14 |
| 7,228,330 B2 * | 6/2007 | Vignaud ...................... 709/203 |
| 2004/0192282 A1 | 9/2004 | Vasudevan |
| 2004/0210433 A1 | 10/2004 | Elazar et al. |

FOREIGN PATENT DOCUMENTS

EP          1304616 A        4/2003

* cited by examiner

*Primary Examiner*—David Y Eng
(74) *Attorney, Agent, or Firm*—Lee, Hong, Degerman, Kang & Waimey

(57) ABSTRACT

The present invention relates to a client configured to operate in a client-server network. The client includes a memory unit and a communication module configured to drive a transmission connection connecting the client and a server, wherein a predefined server configuration, being transferred from the server to the client, is loaded in the client. The client also includes an application module configured to participate in the execution of an application, wherein the client simulates a server configuration by reproducing a server functionality such that the application is self-dependently executable on the client without connection to the server.

43 Claims, 3 Drawing Sheets

CLIENT IN A CLIENT-SERVER NETWORK AND A METHOD OF OPERATION

CROSS REFERENCE TO RELATED APPLICATION

Pursuant to 35 U.S.C. § 119(a), this application claims the benefit of earlier filing date and right of priority to European Application No. 05002890.1, filed on Feb. 11, 2005, the content of which is hereby incorporated by reference herein in its entirety.

FIELD OF THE INVENTION

The present invention generally relates to a client in a client-server network as well as to a method of operating of the client and/or the server.

BACKGROUND OF THE INVENTION

Currently, known customer loyalty systems, such as so-called turnover collecting programs, mostly use paper-based media to facilitate the system or program. For example, letters may be sent to customers as account bills.

In addition to letters, packets with presents, vouchers, discount tickets, customer-cards and discount points are used, for example. However, electronic variants are now also used in the form of credit cards, e-mails and websites with secured user access. Accordingly, customer loyalty programs may be conducted or realized by means of a multimedia application.

However, only a few companies employ a telecommunication system for the operation such customer loyalty programs, for example, a movable data terminal as medium for entering discount points.

An example is a method being currently on the market, the customer loyalty program "VodafoneStars" of Vodafone GmbH, which is realised and managed by the assignee of this applicant. This loyalty program bases on the one hand on usage of mobile communication technology as information and communication media, on the other hand in the form of digital bonus such as downloadable games or computer programs. A bonus is understood as granted multimedia-based services in the form of telecommunication or telecommunications services. Thus, a letter is no longer mailed with an account bill but an electronic message. Furthermore, there will not be issued sales slips or accessories with trade mark devices, but digital bonus as mobile coupons or games. Furthermore, for example, services or marketing with mobile contents as mobile applications come thereby into question. Mobile content, for example, is understood generally as so-called content-data, i.e. in particular music-data, video-data, multimedia-data, text data, measurement values, application programs, in particular games, navigation-data or other software.

As typical data terminal device or data terminal device means on which an application, i.e. an user programs, of the aforementioned kind may run, for example, a cellular or radio frequency telephone or smart phone, a portable computer or a PDA (Personal Data Assistant) with a radio frequency module come into consideration as mobile radio frequency device.

Aside, as to the considered data terminal means, it can by principle concern every electronic device having a form factor coming into question which is portable or can be made portable and comprises a therefor suitable interface to a mobile radio frequency network, for example a GSM-, UMTS- or CDMA-Network or related or adapted technology to the terminal device and can be addressed in a respective manner.

The data terminal device means may, for example, be located in a cellular communication service area, which is covered from one or a plurality of base stations and in which the pre-condition for an transmission operation with respective data transmission apparatuses are given.

The problem of a mobile application with mobile contents arises now essentially how to cope with a complex requirement profile being considered closer in the following, where mutually opposite requirements can emerge, which in turn can be dependent on each other.

Firstly, as to the aforementioned applications it is to speak of wireless applications, which are used for the applications in the aforementioned devices.

In mobile applications of such kind, there is therefore an environment with limited resources in view of network capabilities, display, memory, processor, storable available energy in connection with achievable operating time and input/output terminals.

Further, the usage context of wireless applications, although there could be similarities for wireless applications in view of the aforementioned technologies on first glance, is very different against the one of solid-net-internet applications. Also, it does not concern a downsized or minimized version of solid-net applications, namely because the usage context is a complete different one. The mobile users have to get by with very limited input-/output capabilites, for example, a little alphanumeric input-block or a little display device, which result because of the outer dimensions of the devices.

Aside, the available network connections are not only considerably slower, be it in view of atmospheric influences on transmission channels and propagation phenomenons up to aspects of channel loading, but the are also more expensive.

Firstly, it is on the one hand to be assumed that wired or wireless interfaces on the basis of employing propagating waves are not limitless expandable, be it due to the used frequency bandwidth, the used transmission method, the thereby achievable signal-to-noise-ratio, or the increasing noise by a great number of participants.

On the other hand, the assumption appears to be justified, that in way of the foreseeable technological continuous development in view of the necessary investment cost, the number of users and the application cases on available interfaces will increase over-proportionally to the available channels, the more so as the used methods provide multiple channel loading.

Therefore, available resources as transmission channels will be strained in any case, which can go at the expense of quality for service or transmission, respectively.

But the aforedescribed specification profile consists of the requirement of memory-saving realisation for example in view of terminal device memory and computing power and energy consumption.

In this connection, the question arises, how reasonable it is, that client-bases applications, or applications which run only or substantially on the server, use the terminal device more ore less as a (primitive) input/output apparatus. In this case, a client-server network, where at least one server is connected with one client and forms a network, is used, and any transmission path for mutual information exchange exists between this two network participants.

In turn, the available data rates and channels in connection with the nature of the data to be transmitted and to be authorized, play a role, for example block size or real-time requirements, as at such transmission between client and server, disadvantageous wait-times or delays can emerge.

Recapitulating, in view of the shown requirement profile, thus, for the user of mobile applications and mobile content, which the applicant can make available, is requested, strongly simplified, substantially at first a small transmission effort per se, a big measure of independency, fast availability of contents, and high user acceptance, and namely at small data rates and data volume, respectively and justifiable or reasonable costs.

Thus, the data processing of the data on a central server is insofar promising, as the respective management tasks there can be handled centrally.

But thereby, an improvement of the user guidance by provision of suitable means and mobile applications, respectively, is indeed desirable which exceeds the typical explicit customer setting.

At conventional systems, the delivery of contents takes place over a data transmission channel to the mobile radio frequency device by means of packeted data or data packets. Thereby, the common transmission channel is for example an air interface, which is based on the GSM-OTA (global system mobile-over-the-air) method. The used mobile radio frequency device also offers further interfaces to other devices or the Internet, e.g. Universal Serial Bus, Firewire, Blue Tooth, Infrared, HTTP, HTTPS, SSH, LAN oder MIDI (Musical Instruments Digital Interface).

For mobile applications, in the state of the art, there are applied substantially two approaches on the basis of the following principles.

According to a first approach, the application is carried out message-based, i.e. by short message, SMS. This is transmitted regularly over the signalling channel with up to 160 Characters. Disadvantageous to the SMS-communication is that it is designed asynchronous. Thus, the consumer does not obtain a immediate acknowledgment or feedback of the validity of his messages. Aside, he does neither obtain a confirmation over access nor over the time of delivery of his message.

According to a second approach, the application is WAP—(Wireless Application Protocol) or WEB-based. Thereby, a radio frequency telephone with WAP-capabilities exists which can be located in an network connection with a content provider, a short message server and a mobile switching means, as for example a base station of a radio frequency network. Here is the possibility, as far as the network conditions allow, for an immediate response. However, the communication is limited on circumstances, under which a mobile IP-connection is possible. In addition, costs for the communication are due at once.

Aside, the system configuration described in US 2003/02224810A for a WAP-Push of an SMS be drawn as example. A so-called Push is thereby a data shifting or displacement from a server to a client. In reverse direction, i.e. at a data shifting operation from a client to a server, one talks about a so-called Pull. The data shifting thereby bases on a bi-directional data transmission.

For the proposed WAP data shifting operation, under usage of a bi-directional communication way from the processing unit of the radio frequency phone, with memory-processor-system with a therefore provided application program, a short message is transmitted from the push content server in the terminal device.

Thereby, in terms of transmission, an additional middle program is inserted as intermediary, which is effective, according to the setting of the terminal device, like a kind of multiplexer and an easy internal router for arriving messages, respectively, according to predetermined or preset modes of behaviour. By the additional instance on the one hand, the processing expense in the terminal device is increased significantly, on the other hand, the whole system functions only reliable, if the terminal device is constantly in the network.

Besides the pure content there is also expense for identification and encryption necessary, which entails a substantial or predominant part of the communication expense. Thereby, an encrypted data key is typically transmitted for example via a signalising channel of the mobile radio frequency network, i.e. as SMS, while the transmission of the encrypted data itself is carried out over a GSM data channel. Thereby, the disadvantage of an unequal channel loading can become apparent, on the one hand, available channels can not be utilized.

Also the typical setup, at least a conventional client-server configuration, or as triangle-relation consisting of a kind of licence server for the management of content-related usage rights, for example a content provider and the here considered terminal device client of the user, already provide for a communication expense where in turn continuous presence of the client in the network is required. Thereby, such a system is in terms of accounting relatively intransparent for the user and can meet trust problems at the user. This can even lead thereto that the user avoids an Internet usage and uses his terminal device predominantly for telephony.

In FIG. 1, there is shown the schematic diagram of a conventional arrangement of a client-server configuration 100. In this arrangement, a client 110 is provided, for example a mobile terminal device of the aforementioned type. The client 110 contains a sub-division 120, whereby the sub-division 120 can be done in several levels of hard- and software, for example according to a layer model. At hand, the sub-division 120 specifies a boundary between a hardware level 130 and a software level 140.

Within the hardware level 130 there are provided simplified an output unit 150, e.g. a display, and an input unit 160, e.g. and input field of the mobile terminal device, which represent a user interface, with which the user can communicate.

Within the software level 140 there is located a program with a first module 190. The first program module 190 is shaped for the control of outputs in the hardware level 130 and for receipt of inputs from the hardware level 130. A second module 200 is formed for transmission and forwarding, respectively, and reception over a bi-directional data connection 210, 220, for example an atmospheric transmission path of the aforementioned kind and controls a not-shown hardware for transmission.

In the arrangement of FIG. 1, there is further provided a server 300, which comprises a hardware level 310. In the hardware level 310, there is contained a module 320, which is formed for a control of an also not-shown hardware for transmission to the client 110 and for the operation of the data connection 210, 220.

Furthermore, the server 300 contains a sub-division 330, which represents a boundary between the hardware level 310 and a software level 340. By the sub-division 330, it shall be suggested a strongly simplified ISO/OSI layer model, where a hardware layer as hardware level 310 and a software layer as software level 340 (as well as a sandwiched transport layer not shown) are used.

In the software level 340, which also contains an application, there is located a first module 350, which contains a content, e.g. a data bank for management of contents based on HTML, and a second module 360, which contains a program logic, e.g. a Java script or another script- or interpreter-based language.

In the software level 340, the application can also contain of other constituents, relational data structures and therewith corresponding management structures.

In operation, the client-server configuration substantially functions such that the client operates like an input/output Terminal, i.e. it represents a kind of sourced-out or remote hardware of the server.

Thereby, the application in consequence substantially runs only on the server, so that input- and output are only possible when the client is connected.

Insofar it is assumed that more transmission takes places from server to client on the data connection 220, as in reverse direction on the connection 210. When additionally the client establishes contact with the server automatically in the scope of the application, constant connection costs are generated.

Furthermore, the afore mentioned typical approach of resolution is afflicted with latency, for example according to the loading of the server, which can effect appreciable reaction times or delay, which visibly limit user tolerance. When additionally the user with his terminal device departs of the communication service area or the reception conditions do not offer a sufficient service quality or possibility for connection, this can lead to a sudden crash of the application and mean a possible data loss. For example the user would have to repeat the input of telephone numbers or schedules-as far as possible.

Thus, there is need to improve the operation of a client in a client-server configuration.

SUMMARY OF THE INVENTION

A first aspect of the invention is directed to a client in a client-server network, comprising a memory unit being external to a server wherein a predefined server configuration is transferred from the server to the client and said server configuration is loaded in the client such that an application is independently executable in the client and a simulation of a server function is performed by the client.

According to another aspect, a method of operating a client in a client-server network is provided, comprising fixing or determining a server configuration in a server; transmitting of the server configuration to the client; and executing of the server configuration by the client based on the server configuration loaded on the client such that an application is independently executable in the client and a simulation of a server function is performed by the client.

Other features are inherent in the methods and products disclosed or will become apparent to those skilled in the art from the following detailed description of embodiments and its accompanying drawings.

BRIEF DESCRIPTION OF THE DRAWINGS

Embodiments of the invention will now be described, by way of example, and with reference to the accompanying drawings, in which.

DESCRIPTION OF THE PREFERRED EMBODIMENTS

Figure 2:
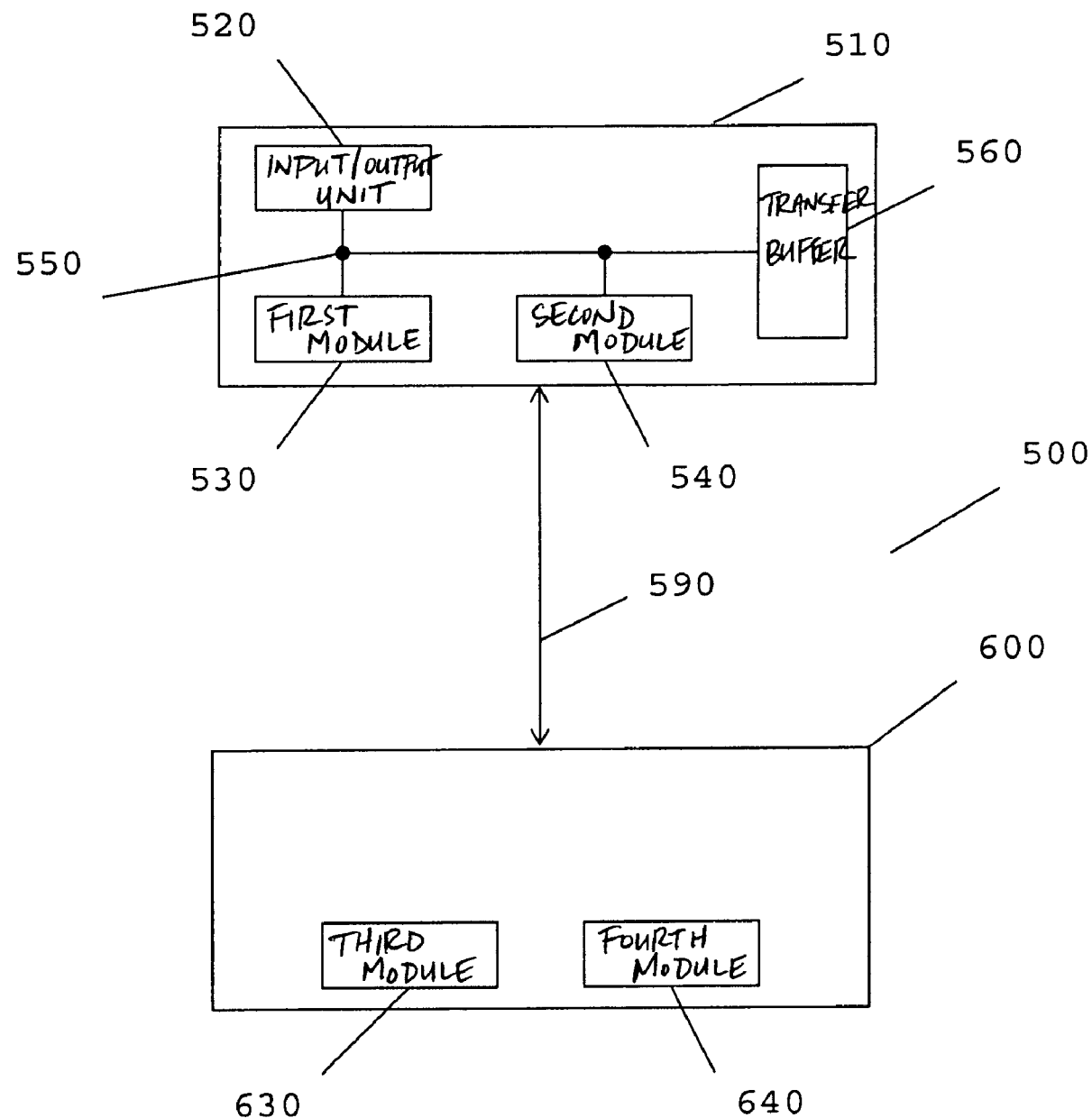
FIG. 2 is a schematic representation of a client-server configuration according to a first embodiment of the present invention.

FIG. 2 is a schematic representation of a client-server configuration according to a specific embodiment of the present invention. Before proceeding further with the detailed description of FIG. 2, however, a few items of the embodiments will be discussed.

According to an embodiment, the client contains a memory unit externally or remotely to a server, whereby the server configuration is loaded into the client such that an application in the client is runnable stand-alone, independently, self-dependent or free-running.

According to another embodiment, the client is a mobile terminal device or is comprised in a mobile terminal device.

According to another embodiment, the client contains an input/output unit as user interface for a user, a first module, with a memory unit, on which data is stored and a second module, with a memory unit on which a computer program is provided ready to run, an internal connection, with an interface and a external connection with a transmission path to a server. The server comprises a third module with a memory unit, on which data is stored and a fourth module with a memory unit on which a computer program is provided ready to run, where the first module in the client with the first module in the server, and the second module in the client with the second module in the server corresponds such that an application is stand-alone executable in the client.

According to another embodiment, there is provided a method of operating a client in a client server network. The method contains the following steps: Fixing or determining of a server configuration in the server; transmitting of the server configuration onto the client; and executing of the server configuration with means of the client on the basis of server configuration loaded onto the client such that an application is stand-alone executable in the client.

According to another embodiment there is provided a method for displacement of server functionality into the client according to the third aspect.

According to another embodiment there is provided a client-server-System with a client according to one of the above mentioned aspects.

According to another embodiment there is provided a server for a client-server-System according to the above mentioned aspect.

According to another embodiment, a computer program is provided, which executes the aforementioned method.

Returning now to FIG. 2, there is shown a client-server configuration 500 according to a first embodiment of the present invention.

Figure 1:
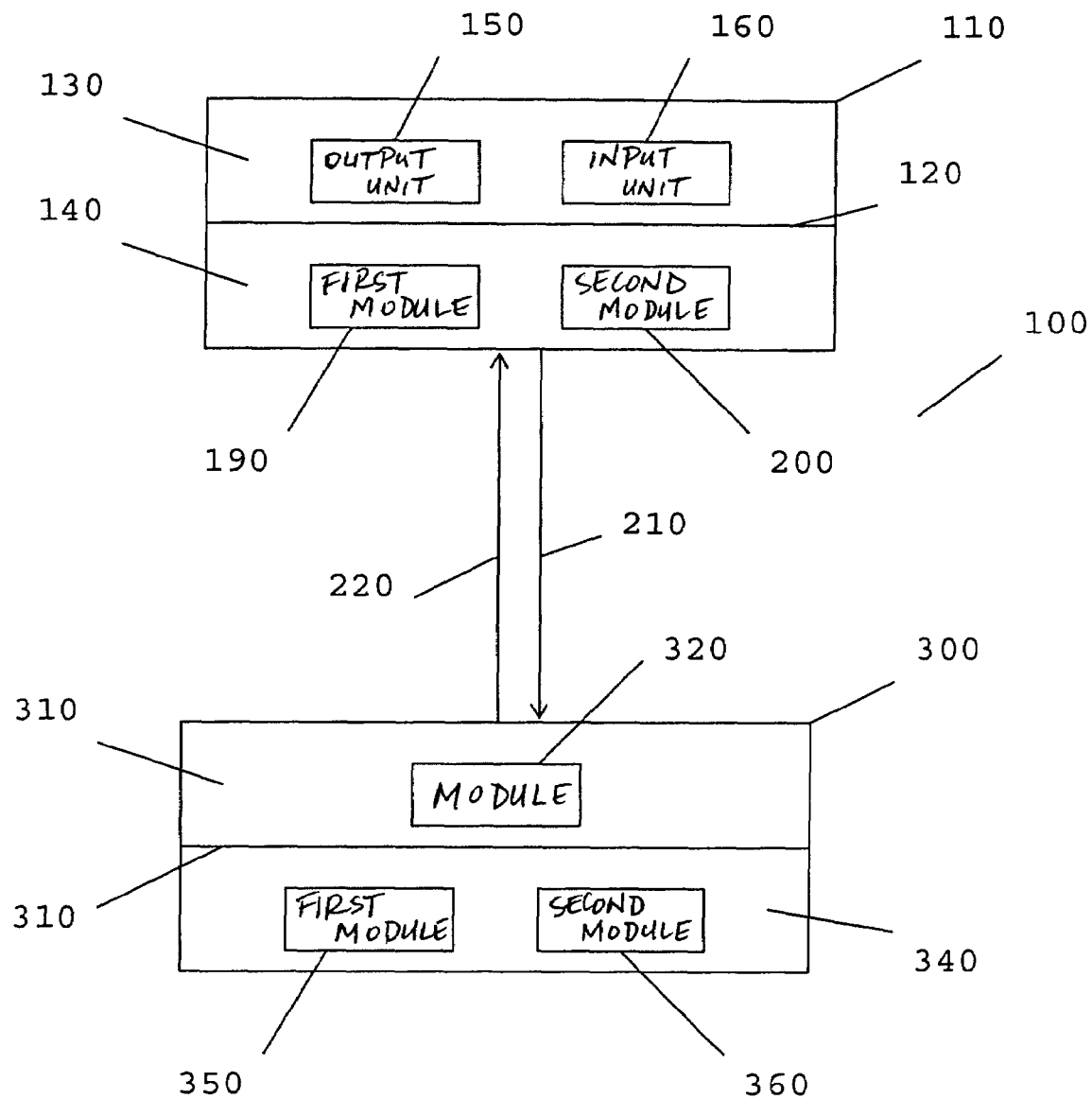
FIG. 1 is a schematic representation of the structure of a client-server configuration of prior art.

In difference to FIG. 1, the client 510 comprises an input/output unit 520, a first module 530 with a memory unit on which data is stored, thereafter called contents, and a second module 540, on which a computer program (a program logic and executable code, respectively) are provided runnable, operable or ready to run.

The first module 530 and the second module 540 participate at the execution of an application, for example a user program, the modules therefore are parts in the sense of components of an application. Hereby is noted that in general a module accommodates for example certain functions, data or data structure, where the module represents a collection of different functions or classes in the sense of an aggregate. Aside, a module can be understood as an operable unit, for example a groupable component or building block of an application. The module also can contain further sub-modules, for example in a hierarchical level structure, whereby it can be suitably provided that the components of a module can alter over time.

In the input/output unit 520 there are contained for example a display, a keypad, input assistances, but also sensors, converters, a microphone, actors, a speaker and other signalising apparatuses and interfaces, with which the user can communicate as user interface.

Thereby, the output unit 520 and the two first modules 530 are combined or connected via an internal connection 550. The connection 550 comprises features of an interface, a bus connection, a bus system or for example parameter or address transfers within the client 510. Further, a transfer buffer 560 can be provided, which is connectable over the connection 550.

Over an external connection 590 for transmission, for example a radio frequency connection interface, the client 510 is connected with a server 600. The radio frequency connection interface is thereby generally a mobile transmission path, in particular an air interface, a water interface or a vacuum interface, which reaches through a medium, which can be operated on or at the boundary layer or interface between two different media including the evanescent field area.

Per se, the server 600 as the client 510 comprise a third module 630 with a memory unit, on which data is stored (content) and a fourth module 640 with a memory unit, on which a computer program is executably provided (Program logic or Code). The driving of the transmission connection 590 is thereby executed by a here non-shown module.

Thereby it is provided that the module 630 in server 600 corresponds with the module 530 in client 510, likewise, that the module 640 in server 600 suitably corresponds with the module 540 in client 510.

After the connection establishment from client and server has taken place, and the transfer with data exchange (download) of the prior coded and predetermined, respectively server configuration has be performed, on the client, a so-called client engine is installed in way of the server simulation of the client. By the engine, the whole functionality formed out of software and hardware is meant, which drives the client.

On this client engine, at the end of the system transfer a system or part of a operation system for example with an application for processing and play back of contents is available, which the module 530 and the module 540 contains and are constituted by the module 530 and the module 540, respectively.

Further according to the embodiment, a first correspondence between module 530 in the client and module 630 in the server and a second correspondence between module 540 in the client and module 640 in the server is formed in afore-described manner.

A first correspondence between module 530 and module 630 can consist during the runtime of the application and simulation, respectively, of the server configuration on the engine of the client or also of an application which is distributed between client and server in that associated data is relocated at certain points in time, and in suitable manner, for example complementary or incrementally, for example during a transmission suitably shifted, swapped, reloaded and for example back-transmitted, respectively.

Beyond that the kind of correspondence can be very various. Thus, the application can be executable self-dependent, by forming a flexible assignment possibility of the memory units of the participated modules.

Thus, the assignment possibility can exist such that on the data side, i.e. concerning the data, the first module 530 in the client 510 with the third module 630 in the server 600, and on the code side, i.e. concerning the code, the second module 540 in the client 510 with the fourth module 640 in the server 600 each comprises an elastic coupling for distribution of the memory units between client and server. Thereby the each elastic coupling is formed in that the module 530 is coupled with the module 630 and the module 540 is coupled with the module 640, respectively.

The correspondence of participating modules can be formed very rich by providing and operating in some way a used memory area which is collaboratively used. This memory area can at first be designed as contiguous memory area.

Then, the module correspondence can be designed as tiled memory area. By address tiles of a tiled memory area there are denoted single, in terms of address, spaced, thus non-contiguous and not continuously addressed, respectively, i.e. not easily linear sequential address areas, for example sections of a memory, in the direction of as- or descending addresses and address areas, respectively, or an overlapping memory.

Thinkable would be also a correspondence by memory compression, i.e. for example, the address area in the module 630 in the server 600 is compressed and imaged on the address area in the module 530 in the client 510, by taking place before the transmission a loss-free information-keeping compression. Before or during the execution in the client, a decompression then can take place. This can be of interest for seldomly used functions, which can be unpacked on demand. Another compression, which is anyway contained mostly lossy in data streams or is used therefore, is left untouched therefrom.

Further, the correspondence of the memory areas by overlapping, duplication (copying) or mirroring or area-wise coupling can be shaped, whereby it is provided to suitably provide required synchronizing (adjustments) of the memory areas of the participating modules for warranty of the data integrity, if necessary.

Also, in terms of client-server corresponding memory areas can form a buffer of a buffer area, for example, a through-shifting buffer, a pipeline, a ring buffer, a FIFO-buffer, a bucket brigade or a cascade.

Thinkable is also an elastic cross-coupling between the first module 530 in the client 510 with the fourth module 640 in the server 600, and the second module 540 in the client 510 with the third module 630 in the server 600. The such over-cross connected modules can be operated as buffers of the aforementioned kind or ring buffers, that the information flow through the modules describes the movement of an eight (8).

In order to enable or to improve a meaningful assignment and coupling, respectively, of the client-side modules with the respective server-side modules, on the server is stored a so-called profile matrix, which closer denotes the resources being available on the client. The profile matrix can further contain data over user-specific settings and adjustment possibilities, respectively, of the client. Basically, the profile matrix reflects the hard- and software-profile in form of a (multi-dimensional) imaging (mapping) of the available resources on the client. Certain profile information thereof describe a suitable memory model, for example of effectively reservable memory size, data transfer speeds, processor powers.

The profile matrix further provides a means to determine the degree of the self-dependency with which the application is executable on the client. This also relates to the distribution in terms of memory of the application between server and client in the sense of an over-spanning application. Thereby, the degree of self-dependency means a ratio of the available memory sizes on the client and on the server, respectively to the whole size of the memory out of the sum of the memory sizes of client and server, which is requested from the application in a certain time interval. This founds for a kind of online-offline-keying-ratio, a connection-efficiency (connectivity) and a client/server code ratio. The last is a dynamical indication therefore, how large the part of code of the application is in terms of memory which runs on the client. Further it is provided that the profile matrix influences the flexible possibility of assignment of the memory units of the participating modules.

Aside, the profile matrix can determine the elastical coupling of the corresponding modules or the cross-coupling.

Beyond that the profile matrix or parts of it can, if necessary, be controlled time-variant or event-dependent, whereby the control in turn can be carried out application-dependent.

A dynamic swapping or reloading and update, respectively can be carried out, in particular, if a subsequent in-or output is carried out on the input-/output unit 520 in the client 510, by an event-dependent, device-dependent, priority-controlled strategy. This strategy can be carried out under consideration of the profile matrix.

For the data shifting in way of the bi-directional data transmission on the client-server network, an adaptive or predictive and weighting (or weighted), respectively, wait queue algorithm can also be provided, for example one which updates after a cache-scheme or a rule-based, neuronal, fractal or fuzzy replacement strategy a memory- or data structure variable incrementally or also differentially.

A differential is thereby according to the invention update understood as an update of the kind, where (similar like the differential pulse-code-modulation) there are only transmitted the changes between for example two successive samples, states or for example graphical representations. For example, no complete HTML-page has to be newly transmitted, if single parts change, but only those parts, which have changed or which still can change.

Further, by an incremental update in the present context or connection is understood for example a blockwise re-loading, where for example the block size can be adjusted variably, in order to shape a download transmission-effective. Thereby, by an incremental or differential update is understood a so-called delta-update. Beyond that, by recording of data movements (tracking), which accompany the update, also earlier, or for example basing thereon future expected changes can be considered. The transmission characteristic can be considered in the profile matrix.

Furthermore, also a dynamic swapping between client an server can be carried out, if the memory in the client is to small for a certain application or the resource-profile in the client has provided only a relatively small memory by the manufacturer's side, such that in any case no limit for the runability of an application per se according to the invention does occur. This can be considered suitably by means of the profile matrix.

For example, a whole contents can result from the sum of the data which is stored in the modules 530 and 630, such that for example the address areas of the modules 530 and 630 can attach address-linear in predescribed manner.

A second correspondence between module 540 an module 640 can consist in that a program logic, for example in the form of classes, is relocated at a certain pointing time. This can happen depending on each application in suitable manner, for example be included in the application, or for example sequentially during a transmission and download, respectively. Thereby, parts of the program logic are shifted between server and client, alternately or reciprocally relocatibly swapped.

For example, the therefore required functions in the client for an offline-operation can be transmitted from server on the client before and can be reloaded, changed or substituted during the runtime.

Required functions are thereby such functions, which the client needs, in order that it can self-dependently execute an application or parts of it. This can in particular be a function for a processing or a pre-processing of user-inputs, which are later processed in the server, for example a pre-filling from fields in a relational data structure or the forming of relations in connection with learned or user-specific gained information (personalizing) including location information.

Aside, a function can also provide to carry out a conditioning of information, a play-back of data streams, a defragmenting of the memory, or a sending-preparation (queuing) in connection with the buffer 560 or batch-processing. The buffer 560 can thereby be formed with methods like at the aforementioned data shifting. If the user for example has to write many messages, these can be collected and than transmitted as a bundle at the sending unit.

Further, the software update and the delta update, respectively, can be provided also where parts of the initially named mobile contents or descriptions therefore are loaded into the client, in order to take notice of, to listen, to read or to view them as a so-called preview later, i.e. as part or summary of the content.

At an offline operation, i.e. the client runs alone and self-dependent, respectively without connection to the sever, the client is either deliberately, i.e. by a explicit user-input decoupleable (i.e. to be coupled-off or freed) from the network, or non-deliberately, because there is no network available, or because, for example a field strength indicator (RSSI=Radio Signal Strength Indicator) detects a transmission situation with field strengths ratios where a communication is insecure, to many transmission errors occur, or avoidable costs arise. Thereby, the application can recommend the user at decreasing transmission quality, to change himself to the offline operation and as far as possible to still load and to place into stock, respectively, some program code for reserve.

Figure 3:
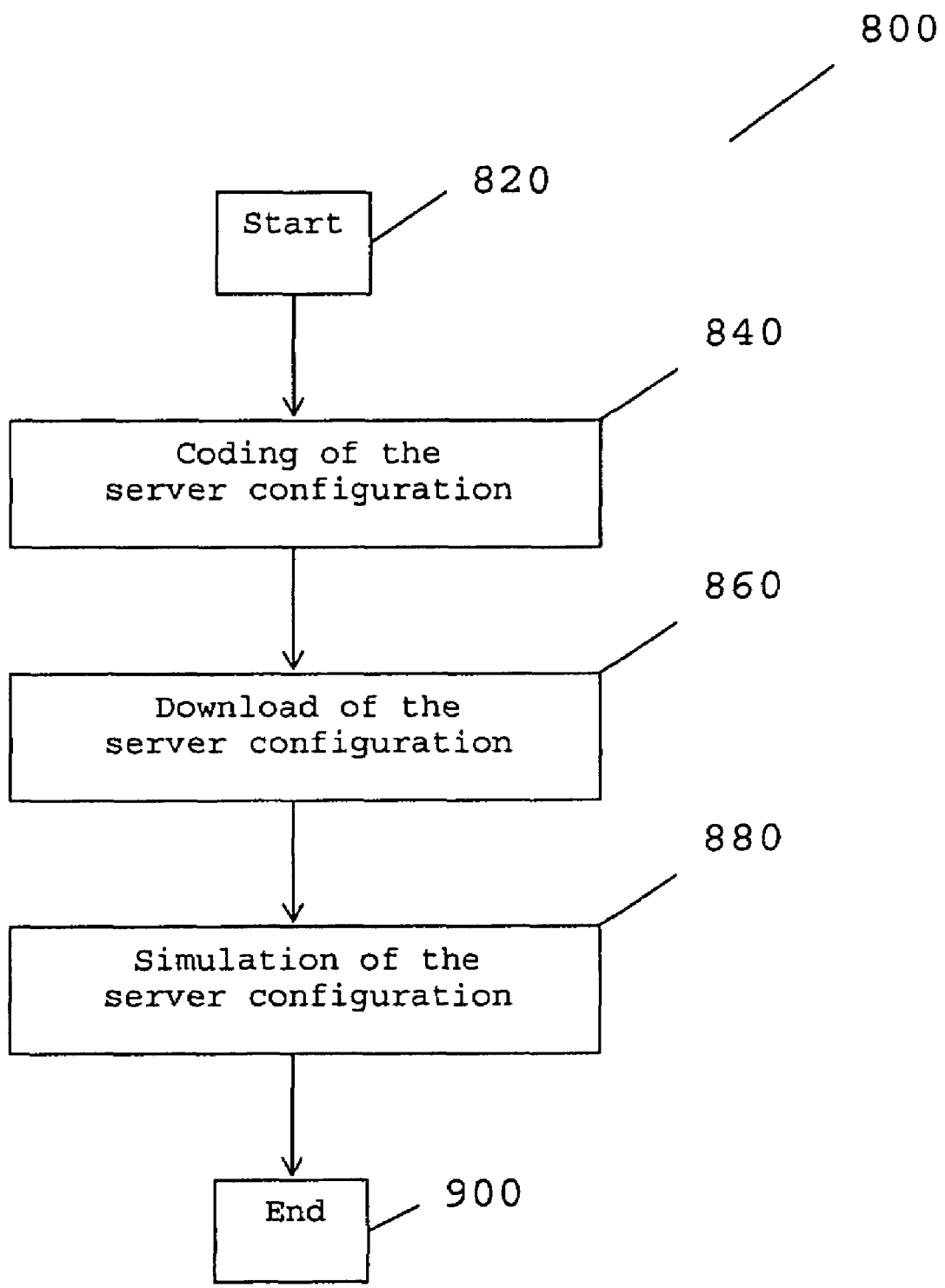
FIG. 3 is a principle scheme of an embodiment of an inventive method of operating a client-server network on a client including transfer of a server configuration on a client.

FIG. 3 shows an embodiment of a method of operating a client-server network on a client including the transfer of a server configuration on a client.

The transfer begins after the start, step 800 until the end, step 900 and describes the single steps with which a client is placed in a position to self-dependently execute applications (also) without connection to the server.

Thereby for example a connection to the server or a server characteristic is simulated as a virtual connection in the client so that there is no or substantially no difference for the user, whether the client is actually connected to the server (online operation) or whether the client executes the application for his own direction (offline operation).

The first step 820 represents the entry in the transfer routine. Thereby, in a pre-configuration or preset-adjustment from the applicant or the manufacturer's side there can be provided for example that the client is formable as standalone client. Further can be provided that the user can equip or provide the client with this additional functionality.

In the next step 840 the coding and determination, respectively, or specification of a server configuration is carried out. This can be suitably carried out by means of the profile matrix.

Thereby, for example corresponding data structures or contents to be transmitted can be prepared or formatted, whereby therefore for example also a decompression on a server- and sender side, respectively, with a corresponding decompression on a client and receiver side, respectively (possibly also in connection with a data modulation or demodulation of a data signal and a modulated data sequence, respectively) comes into question. Alternatively, the compression can be carried out first after transmission in the client. Asides, in case of a modulation/demodulation for example a demodulation can be carried out also by a (repeated) modulation with the same method or with an inverse function, correspondence or imaging (back transformation) which is complementary to the preceding modulation, such that the two terms modulation and demodulation, respectively, are ex- or interchangeable. Above named is similarly valid for compression and decompression.

In the following step 860 the downloading of the server configuration is carried out in Push or Pull. Thereby, the client is correspondingly installed, by correspondingly unpacking or decoding the before coded or packed data or data structures. Thereby for example a user surface of a computer program or an application is installed for operation of the same, which is self-dependently executable on the client.

In the next step 880 the simulation of the server configuration is carried out by means of the client engine. Thereby, the application is started correspondingly.

Further, at the transmission between and also within the afore named steps, there can be provided not-shown, per se known methods or algorithms for identification and error correction and repetition, respectively, of the transmission as also parity checks or check sums for assurance and surveillance of the data integrity.

An advantage of the above embodiments of the invention consists in that to provide a way with which structures of a client can be improved or overcome user-restrictions at software development and hardware platforms which exist from manufacturer's side or are product-specifically immanent.

The awareness lies at the bottom of the above embodiments that by means of a relocation of content on the one hand and the program and program code (program logic), respectively, on the other hand, from server in a client, an improved consideration of the requirement profile can be provided. Thereby, the content for example can be formed, realized, described or be executable in a markup language, HTML, SGML, or a free derivative thereof. The program logic can for example be formed, realized, described or be executable as classes, objects or functions for example with Java-script or in with JMEE programmed modules.

For example, it can be provided or indicated, not to use HTML and JavaScript in a first version of the client, if they are too mighty for the client in view of usage of resources and memory, respectively. For the content, a page description language can be provided, which is based on HTML, which orients at it, or which can be free and is rather to be compared with SGML. The logic of the application, so the program by itself, must not necessarily be imaged in JavaScript, but can retrieve itself rather in JMEE-programmed modules, if there would also get to much memory space lost. Indeed, it is however in later versions of the client thinkable, for example because of more available memory or CPU-power to revert to already existent logics for page description and program.

According to the present embodiment, a validation of user input without the generation of connection cost is enabled by the application, as this can be carried out on the client standalone.

In particular, the state, in which the application is, can be represented transparently. Already with that critical states up to potential dangers of a data loss can be avoided and the availability can be increased. Further, suitable strategies for defragmentation of the memory can be provided.

Further it is possible, to enable a prompt evaluation of the inputs and user-feedback, as acknowledgment from the server are thereby not necessarily required. With that for example, the user can be supported at the editing of suitable forms.

Preferredly is provided a mobile example-application, in particular a camera-based multimedia-application, which enables to condition or pre-process a MMS-Message in the client by intuitive manner and to send it first after its completion with possible other data.

As a result, a client with advantageous characteristics for transmission and usage is defined according to the aforedescribed structure.

The structural advantages of the embodiment consist in that the client is capable to offer a server functionally and to simulate it, respectively, such that the applications can be executed self-dependently.

Further, it is assured that the single modules on the client side are configuratively adjusted independently from the existence of a server connection during the runtime of the application, thus also out of the communication service area.

Further, there exist significant advantages that the user can also act upon the running of the application in way of alterable adjustments. This is according to the invention achieved by the provision of dynamic menu structures, which enable a context-sensitive dynamic navigation. The last means the support of the movement of the user in a menu structure, i.e. substantially the handling or operation of the application by provision of suitable auxiliary means, as the provision of certain menu elements, information or functions dependent from the context of a just displayed information or page (display-contents) and dependent of a state or an event in which the application is situated, respectively.

Further, a dynamic personalising can also be formed. Thereby, the user-navigation, i.e. for example the user behaviour on the basis of the menu elements accessed by the user, services or internet pages during a server connection or after a certain number of connections to the server can thereby be transmitted and serve to adapt the client corresponding to the navigation, thus to personalize. This can happen in view of aforedenoted dynamical menu structure or content. This thus updated client is offered as update to the user.

It is succeeded by the definition of a client to employ parts of the server functionality by means of organisation and technically optimised and to move suitably in the client.

In other words, in particular matching loss to the user behaviour and the response characteristic of the client for the user, time loss in case of non-availability of the communication service or of the server per se a transmission cost can be avoided which system-immanently arises with conventional approaches.

By the definition of a client according to an embodiment, the production of comfortable functions or software is thereby possible as well as the support of mobile networks under limited resources.

The definition of the client additionally enables a faster, bundled and thus overall cost-effective communication with the server, because the user can control the costs by his behaviour, in any case can contribute in decision. This leads to a higher user satisfaction.

Thus, the present invention also allows an adapted and secured user guidance with the possibility of switching off of certain or arrangement of suitable menu elements in the client application.

Thus, also a secure application can be provided for example for controls.

Further, a personalizing of the application per se can be provided. Thereby, the user behavior and, on the basis of the processed data, a possibility of the configurability of the application is given. The time of maturity is shortened, the cost reduced, the usage simplified.

An embodiment of the present invention comprises the substantially relevant functional groups of an intelligent client 510.

Also, a method serves for solution of the object. In the following, the single steps of the method are described closer.

The essential steps must not necessarily be carried out in the given order, and the method can also comprise further not named steps.

Firstly, in a first step the server configuration for the client is coded on the server.

In a second step the data exchange is carried out, where the coded and assigned, respectively, or selected server configuration is sent to the client (download).

In a third step, the simulation of the server configuration is carried out on the client. By simulation, there is to be understood a behaviour of the client, where for example the characteristic of server which is just not available is reproduced or emulated.

Further, a computer program belongs to the scope of the invention, which at running carries out the method according to the invention in one of its embodiments on a computer or a plurality of computers of a computer network.

Furthermore, a computer program with commands/instructions (program code means) belongs to the scope of the invention, in order to carry out the method according to the invention in one of its embodiments, when the program is executed on a computer or on a plurality of computers in a computer network, in particular a mobile client-server network. In particular, the commands can be stored on a computer-readable data carrier.

Overmore, a data carrier belongs to the scope of the invention, on which a data structure is stored, which can execute the method according to the invention in one of its embodiments in the sense of the invention after a loading in a working- and/or main-memory of a for example mobile computer or a plurality of computers of a computer network for example of the aforeconsidered kind in the communication service area.

According to an embodiment, the scope of the invention also comprises a computer program product with program code means stored on a machine-readable carrier, in order to carry out the method according to the invention in one of its embodiments, when the program is executed on a computer or a plurality of computers of a computer- and radio frequency network, respectively.

Thereby, by a computer program product, the program is understood as marketable product. It can basically be present in arbitrary form, so for example on paper or a computer-readable data carrier and can in particular in the sense of the invention be suitably distributed over a data transmission network for example within a communication service area or the Internet.

At last, a modulated data signal belongs to the scope of the invention which includes executable instructions for executing the method according to the invention in one of its embodiments from a computer system or a plurality of computers of a computer network. As computer system come into view the terminal device as mobile stand-alone computer as well as a network of computers, for example a house-internal, closed network or also computers, which are connected with each other over the internet.

The computer system further can be realized by a client-server-constellation or by way of precaution even as client-client- and peer-to-peer configuration, respectively, for example for games or for service-tasks, where parts of the invention are running on the server, other on a client. Thereby, the additional so-called near client takes a similar role as a server.

Besides, position finding of the terminal device by a GPS-method, a localization of the same can also be carried out in way of mini-GPS, for example based on the evaluation of runtime differences over adjacent base stations or mobile stations.

All publications and existing systems mentioned in this specification are herein incorporated by reference.

Although certain methods and products constructed in accordance with the teachings of the invention have been described herein, the scope of coverage of this patent is not limited thereto. On the contrary, this patent covers all embodiments of the teachings of the invention fairly falling within the scope of the appended claims either literally or under the doctrine of equivalents.

What is claimed is:

1. A client configured to operate in a client-server network, said client comprising:
    a memory unit;
    a communication module configured to drive a transmission connection connecting the client and a server, wherein a predefined server configuration, being transferred from the server to the client, is loaded in the client; and
    an application module configured to participate in the execution of an application, wherein the client simulates a server configuration by reproducing a server functionality such that the application is self-dependently executable on the client without connection to the server,
    wherein a profile matrix stored in the server is configured to determine a degree of self-dependency with which the application is executable on the client, and
    wherein the client is a mobile communication terminal.

2. The client according to claim 1 further comprising:
    an input-output unit as a user interface for a user;
    a first module with a memory unit, on which data is stored;
    a second module with a memory unit, on which
    a computer program is provided to be self-dependently executable;
    an internal connection with the user interface, and an external connection with a transmission path to the server, wherein the server comprises a third module with a memory unit, on which data is stored and a fourth module with a memory unit, on which a computer program is provided to be executable, wherein the first module in the client forms a correspondence with the third module in the server, and the second module in the client forms a correspondence with the fourth module in the server such that the application is self-dependently executable in the client.

3. The client according to claim 2, wherein the application in the client is self-dependently executable by flexibly assigning the memory units of the -modules in the client to the memory units of the modules in the server.

4. The client according to claim 3, wherein on a data side, the first module in the client is assigned to the third module in the server, and, on a code side, the second module in the client is assigned to the fourth module in the server to comprise an elastic coupling for distributing the memory units between client and server.

5. The client according to claim 2, wherein the first module in the client forms a correspondence with the third module in the server, by forming a contiguous memory area.

6. The client according to claim 2, wherein the second module in the client forms the correspondence with the fourth module in the server by forming a contiguous memory area.

7. The client according to claim 6, wherein the memory area is tiled.

8. The client according to claim 6, wherein the memory area is overlapping, duplicated or mirrored.

9. The client according to claim 6, wherein the memory area is formed as a buffer.

10. The client according to claim 9, wherein the buffer is operated as a ring-buffer area-wise.

11. The client according to claim 3, wherein the first module in the client is assigned to the fourth module in the server, and the second module in the client is assigned to the third module in the server to comprise an elastic cross-coupling for distributing the memory units between the client and server.

12. The client according to claim 11, wherein the modules of the cross-coupling are operated as a ring-buffer such that information flows through the modules in a figure-eight movement.

13. The client according to claim 3, wherein the profile matrix indicates available resources on the client.

14. The client according to claim 13, wherein the profile matrix influences the flexible assignment of the memory units of the modules in the client to the memory units of the modules in the server.

15. The client according to claim 13, wherein the profile matrix determines an elastic coupling of the corresponding modules.

16. The client according to claim 13, wherein the profile matrix determines a cross coupling of the corresponding modules.

17. The client according to claim 13, wherein parts of the profile matrix are controlled by time-variance or event-dependence.

18. The client according to claim 1, wherein the application is executable on the client to enable validation of user-inputs without generating connection costs.

19. The client according to claim 1, wherein a state in which the application is located, is transparently representable and transmittable to the server.

20. The client according to claim 1, wherein the application is executable to provide a contemporary evaluation of user-inputs and an acknowledgement to a user.

21. The client according to claim 1, wherein the application is executable to enable a user to build an interactive user profile with a menu structure where the user can switch single elements or content.

22. The client according to claim 1, wherein the application is executable to support a dynamic swapping or a dynamic reloading.

23. The client according to claim 1, wherein the application is executable to provide a context sensitive dynamic menu structure, wherein certain menu elements, information or functions arise which are dependent from a context, a state or an event of the application.

24. The client according to claim 1, wherein the application is executable to support a dynamic personalization, wherein a user-navigation on the client is transmitted to the server and enables the client to adapt based on the navigation.

25. The client according to claim 2, wherein a transmission between the first module and the third module is performed by means of a transmission method, that allows a transmission by means of channel bundling or several simultaneously occupiable channels of different transmission systems.

26. The client according to claim 2, wherein a transmission between the second module and the fourth module is performed by means of a transmission method, that allows a transmission by means of channel bundling or several simultaneously occupiable channels of different transmission systems.

27. The client according to claim 1, wherein the application can build up and down a connection from the client to the server, which is time controllable.

28. The client according to claim 1, wherein the connection from the client to the server is event dependent, requirement dependent or semi permanent.

29. A method of operating a client in a client-server network, comprising:
determining a server configuration in a server;
determining a degree of self-dependency with which an application is executable on the client using a profile matrix stored in the server:
transmitting the server configuration to the client and loading the server configuration in the client; and
simulating a server configuration on the client by reproducing a server functionality such that the application is self-dependently executable on the client without connection to the server,
wherein the client is a mobile communication terminal.

30. The method according to claim 29, wherein in at least one of the steps a differential or incremental data shifting (delta update) is performed.

31. The method according to claim 29, wherein the server configuration itself is executable on the client.

32. The method according to claim 29, wherein the server configuration is carried out as Push or Pull.

33. The method according to claim 29, wherein the server configuration is carried out as a broadcast.

34. The method according to claim 29, wherein determining the server configuration is carried out according to the profile matrix.

35. The method according to claim 34, wherein parts of the profile matrix are controlled by time-variance or event-dependence.

36. The method according to claim 29, wherein the application is executable on the client in order to enable validation of user-input without generating connection costs.

37. The method according to claim 29, wherein the application is executable in order to provide a contemporary evaluation of user-input and an acknowledgement to a user.

38. The method according to claim 29, wherein the application is executable in order to enable a user to build an interactive user profile with a menu structure wherein the user can switch single elements or contents.

39. The method according to claim 29, wherein the application is executable in order to support a dynamic swapping or a dynamic reloading.

40. The method according to claim 29, wherein the application is executable to provide a context-sensitive dynamic menu structure wherein certain menu elements, information or functions arise, which are dependent from a context, a state or event of the application.

41. The method according to claim 29, wherein the application is executable to support a dynamic personalization wherein a user navigation on the client is transmitted to the server and enables the client to adapt based on the navigation.

42. The method according to claim 29, wherein a transmission between the second module and the fourth module is performed by a transmission method that allows the transmission via several simultaneously occupiable channels of different transmission systems or allows a transmission by means of channel bundling.

43. The method according to claim 29, wherein the application builds up and down a connection from the client to the server which is time controllable.

* * * * *